Jan. 23, 1951

C. H. WOODCOCK 2,538,890

TUBE CUTTER

Filed May 23, 1945

Attest
Robert I. Staples
Andrew T. Zodl

INVENTOR.
Charles H. Woodcock
BY Norbert E. Birch
Attorney

Jan. 23, 1951     C. H. WOODCOCK     2,538,890
TUBE CUTTER

Filed May 23, 1945     3 Sheets-Sheet 3

Attest
Robert I. Staples
Andrew T. Zodl

INVENTOR.
Charles H. Woodcock
BY Norbert E. Birch
Attorney

Patented Jan. 23, 1951

2,538,890

UNITED STATES PATENT OFFICE 2,538,890

TUBE CUTTER

Charles H. Woodcock, Philadelphia, Pa., assignor to The Atlantic Refining Company, Philadelphia, Pa., a corporation of Pennsylvania Application May 23, 1945, Serial No. 595,391

5 Claims. (Cl. 30—104)

This invention relates to improvements in devices designed to cut or sever tubes, pipes, or the like.

In oil refineries and other industrial units where heat exchangers are used, a problem has arisen in connection with the removal of a damaged or worn-out tube. Such exchangers are generally composed of a bundle of tubes contained in a cylindrical casing, the open ends of the tubes being secured to the tube sheets by swaging or by rolling. When a tube other than one on the periphery of the bundle has been damaged and must be removed, it cannot be cut loose by use of the conventional external cutter because of the other tubes surrounding it. To overcome this difficulty means must be provided which will effect the severing of the tube on the inner side of the tube sheet, such means being operable from the outer side of such tube sheet.

Furthermore, due to its use in refineries and workshops where it will be handled by various workers and will be accorded hard usage, such device must be of sturdy construction and adapted to be used by relatively unskilled labor.

Therefore, one of the objects of the invention is to provide means for cutting tubes, such means being adapted for insertion into such tubes and readily operable externally thereof.

A further object of the invention is to provide means for cutting tubes at a desired place therewithin in which the cutter element is eccentric to the guide member and in which simple rotation, rather than a spiral movement involving longitudinal displacement, is used to bring such cutter element into operable contact with the walls of the tube to be cut.

Another object of the invention is to provide means for cutting tubes, such means being of relatively rugged construction and simple in operation.

Other objects of the invention will readily be apparent from the description and claims which follow.

Referring now to the drawing in which like numerals are used to designate like parts:

Figure 1:
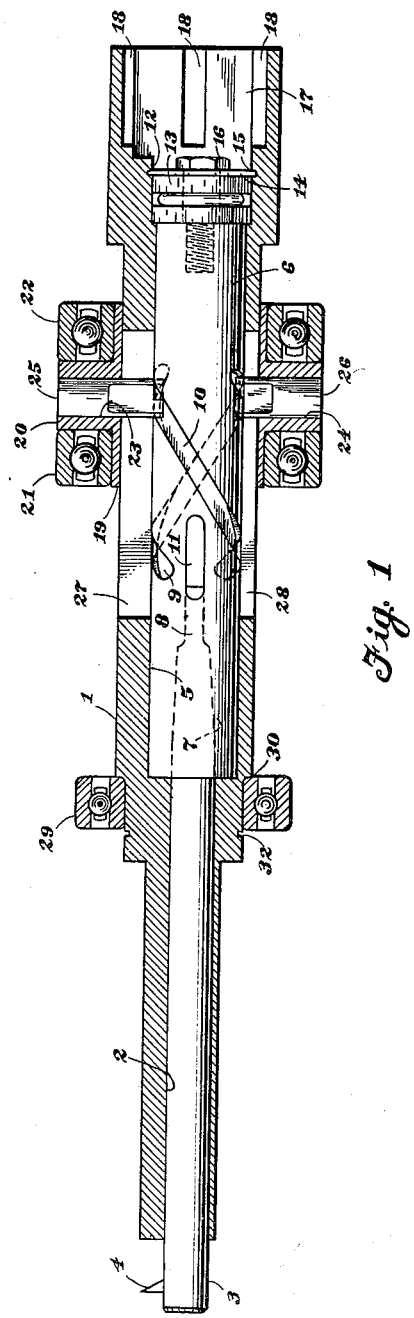
Figure 1 is a side view of a portion of the device partially in cross section.
Figure 2:
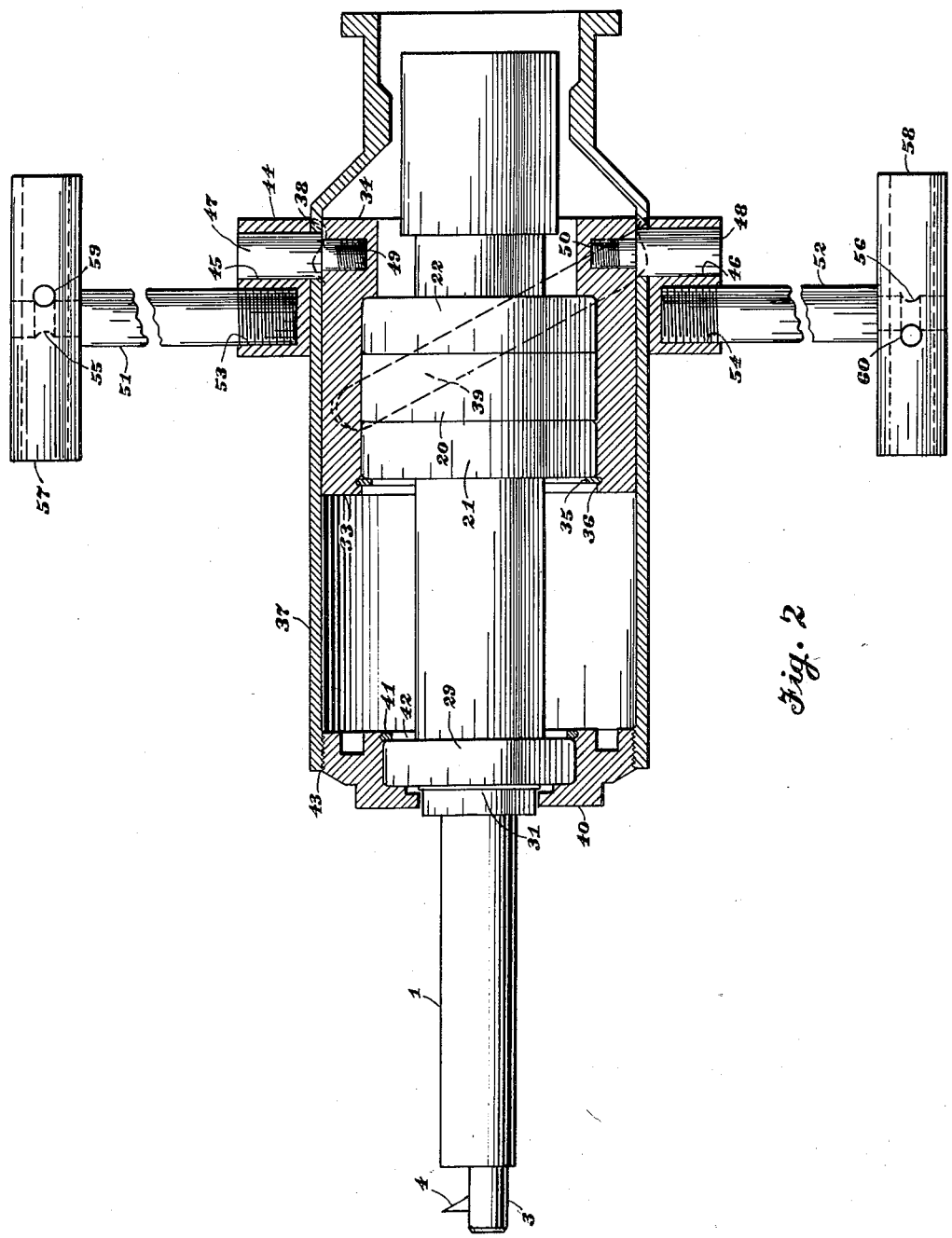
Figure 2 is a side view of the device showing Figure 1 in elevation and the remainder of the device partially in cross section.
Figure 3:
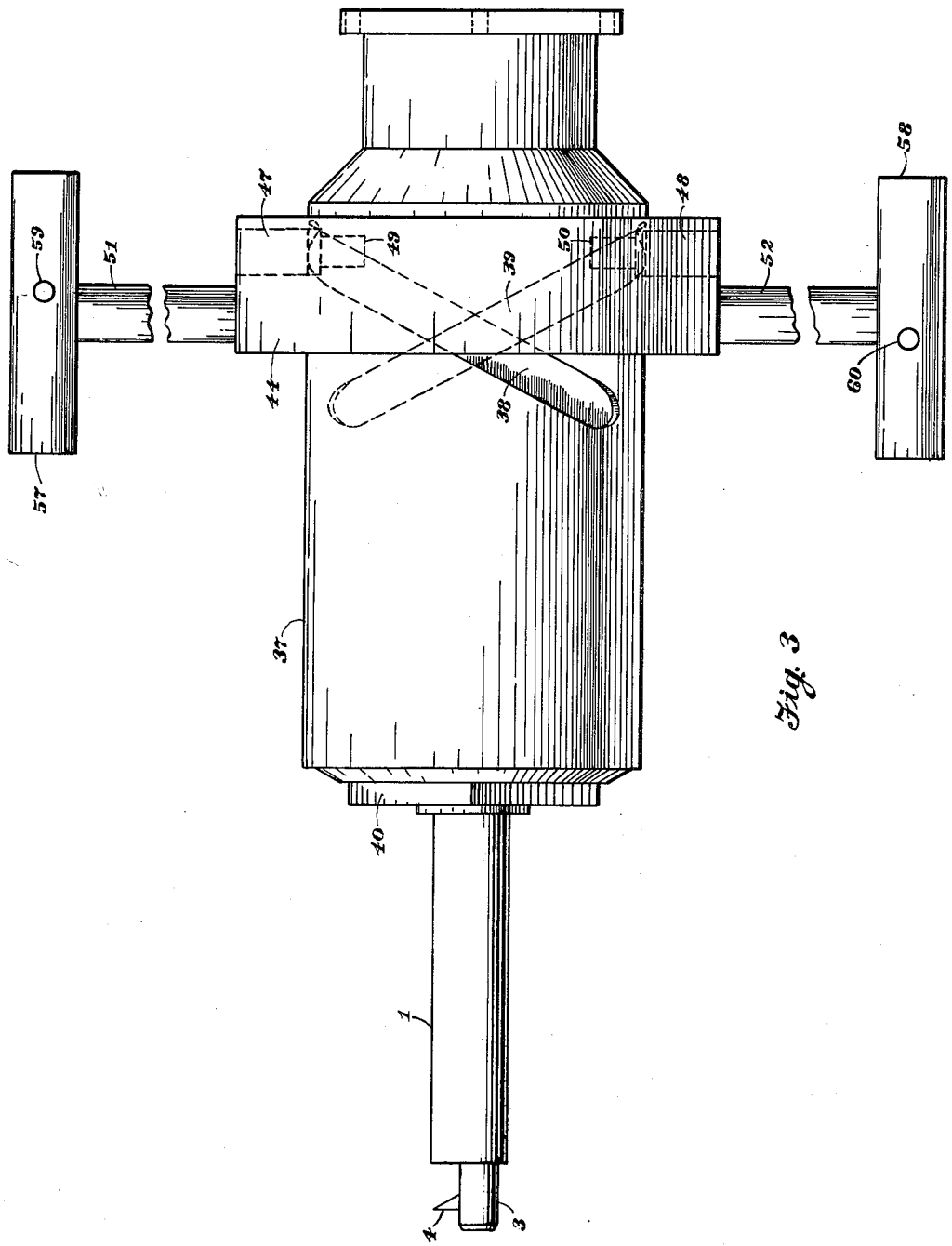
Figure 3 is a side elevation of the device of the present invention.

The device shown in the drawings comprises a cylindrical housing 1 bored eccentrically as at 2 to permit the insertion therein of cutter bar 3. Immovably affixed to cutter bar 3 is a cutter 4. Housing 1 is further bored eccentrically as at 5. A sleeve member 6, rotatably positioned in eccentric bore 5, is recessed as at 7 to accommodate the tapered end 8 of cutter bar 3. Sleeve member 6 is provided with parallel spiral grooves 9 and 10 and transverse slot 11, the purposes of which will be described hereinafter.

A further eccentric bore 12 in housing 1 contains thrust bearing 13 which is removably held therein by slip ring 14 positioned in internal groove 15, or by other suitable means. Sleeve member 6 and thrust bearing 13 are held together by bolt 16 or by other suitable means. Housing 1 is further formed with a concentric bore 17 and a plurality of longitudinal grooves 18, the purpose of which will be described hereinafter.

A ball race carrier 19, having external flange 20 formed thereon, surrounds housing 1 and is adapted for longitudinal movement on such housing. Slidably mounted on ball race carrier 19 on opposite sides of external flange 20 are ball races 21 and 22. External flange 20 on ball race carrier 19 is provided with holes 23 and 24 to accommodate operating pins 25 and 26 respectively, such operating pins being adapted to extend through diametrically opposed slots 27 and 28 respectively formed in the wall of housing 1 and to operably engage parallel spiral grooves 9 and 10 in sleeve member 6. Ball bearing 29 positioned on housing 1 is removably held adjacent shoulder 30 by slip ring 31 disposed in groove 32 in housing 1 or by other suitable means.

An inner casing 33 surrounds ball races 21 and 22 and ball race carrier 19 and is adapted for longitudinal movement therewith. An internal flange 34 is formed on inner casing 33. Slip ring 35 positioned in groove 36 formed internally of inner casing 33 is adapted to hold ball races 21 and 22 and ball race carrier 19 within inner casing 33, ball race 22 being held in operative contact with, or abutting, internal flange 34 on inner casing 33. Mounted on inner casing 33 is an outer casing 37 provided with spiral slots 38 and 39, the purpose of which will be hereinafter described.

Cap member 40 is adapted to receive bearing 29 which is held in contact therewith by slip ring 41 positioned in internal groove 42 in the cap member. Outer casing 37 and cap member 40 are connected threadably as at 43 or by other suitable means.

Mounted on outer casing 37 and adapted for limited rotation and longitudinal movement in relation thereto is a collar 44 having a plurality of holes 45 and 46 radially formed therein. Bolts 47 and 48, disposed in holes 45 and 46 respectively, extend through spiral slots 38 and 39 respectively in outer casing 37 and threadably engage inner casing 33 as at 49 and 50 respectively.

Operating arms 51 and 52 are threadably affixed to collar 44 at 53 and 54 respectively and are formed with circumferential grooves 55 and 56 respectively spaced from the outer ends thereof. Handles 57 and 58 are rotatably positioned on operating arms 51 and 52 and held thereon by the coaction of retaining pins 59 and 60 and circumferential grooves 55 and 56 respectively.

The operation of the device is as follows:

A source of power, such as an electric motor or air-driven motor (not shown) adapted to impart the necessary rotating movement to the housing 1 is operably engaged with longitudinal grooves 18 in concentric bore 17 in housing 1, the motor being provided with a shaft carrying splines corresponding to longitudinal grooves 18. The casing of the electric motor or air-driven motor is secured to the flanged end of outer casing 37 thereby maintaining casing 37 stationary during the cutting operation.

Rotary motion is then applied by the driving motor operably engaged with longitudinal grooves 18 in housing 1. As a result of the application of such rotary motion, housing 1 containing sleeve member 6 and cutter bar 3 is rotated within ball races 21 and 22 and ball bearmember 29.

Housing 1, ball race carrier 19, sleeve member 6, and cutter bar 3 rotate as one, since operating pins 25 and 26, extending through slots 27 and 28 transmit the rotary motion of housing 1 to ball race carrier 19 and sleeve member 6.

The opposite end of housing 1 carrying cutter bar 3 is inserted into the tube to the depth at which it is desired to make the cut, cutter 4 being in the retracted or inoperative position. In order to bring cutter 4 into the extended or operative position and thereby into contact with the tube wall, handles 57 and 58 and operating arms 51 and 52 are revolved in a counterclockwise direction. By reason of the revolution of operating arms 51 and 52 collar 44 is rotated and advanced longitudinally with respect to outer casing 37, since bolts 47 and 48 carried by the collar follow spiral slots 38 and 39 respectively in outer casing 37.

Simultaneously therewith, inner casing 33 is rotated and advanced longitudinally within outer casing 37 by bolts 47 and 48 coacting with spiral slots 38 and 39 respectively in the outer casing. During this movement, inner casing 33 rotates in a counterclockwise direction on ball races 21 and 22, and is advanced longitudinally with respect to housing 1. The longitudinal movement of inner casing 33 is transmitted through internal flange 34 to ball race 22, forcing it together with ball race carrier 19 and ball race 21 to slide longitudinally on housing 1.

As ball race carrier 19 advances longitudinally on housing 1, operating pins 25 and 26, positioned in holes 23 and 24 respectively in external flange 20 on carrier 19 transmit the motion to sleeve member 6 by reason of the engagement of such operating pins with spiral grooves 9 and 10 in the sleeve member. Due to the coaction of operating pins 25 and 26 and spiral grooves 9 and 10 respectively, the longitudinal movement of ball race carrier 19 is translated into a clockwise rotation of sleeve member 6 rotatably positioned within housing 1. Actuated by the clockwise rotation of sleeve member 6 in relation to housing 1, cutter bar 3 rotates with the sleeve until cutter 4 comes into operable engagement with the wall of the tube.

By applying continuous counterclockwise force to handles 57 and 58 and operating arms 51 and 52, cutter 4 will be maintained in operative engagement with the tube wall at all times during the cutting process.

If it is desired for any reason to withdraw the cutter bar from the tube, handles 57 and 58 and operating arms 51 and 52 are turned in a clockwise direction thus reversing the operation described above and returning cutter 4 to the retracted or inoperative position.

It will be noted that should cutter 4 become broken or worn out, or if it should be desirable to replace it for any other reason, cutter bar 3 can be removed from its position by a slight force applied to the end of the cutter bar through transverse slot 11 in sleeve member 6, after the device has been disassembled.

The example here given and the particular description set forth are merely presented in order to illustrate how the invention may be applied. Other forms and variations coming within the scope of the appended claims will readily suggest themselves to those skilled in the art.

I claim:

1. A device for cutting a tube comprising an eccentrically bored housing having longitudinal slots formed therein, a sleeve member positioned in the bore and having spiral guide means formed thereon, cutter means affixed to said sleeve member, operating pin means engaging said spiral guide means and extending through said longitudinal slots, means carrying said pin means and mounted for slidable movement along the housing, inner casing means surrounding said carrying means whereby the sleeve member may be rotated relative to said housing to bring the cutter means into engagement with the tube by longitudinal movement of said inner casing means, and bearing means positioned between said inner casing means and said carrying means for permitting free rotation of the latter means within said inner casing means.

2. A device for cutting a tube comprising an eccentrically bored housing having longitudinal slots formed therein, a sleeve member positioned in the bore and having spiral guide means formed thereon, cutter means affixed to said sleeve member, operating pin means engaging said spiral guide means and extending through said longitudinal slots, means carrying said pin means and mounted for slidable movement along the housing, inner casing means surrounding said carrying means, bearing means positioned between said inner casing means and said carrying means for permitting free rotation of the latter means within said inner casing means, and means for imparting longitudinal movement to said inner casing means whereby the sleeve member may be rotated relative to said housing to bring the cutter means into engagement with the tube.

3. A device for cutting a tube comprising an eccentrically bored housing having longitudinal slots formed therein, a sleeve member positioned in the bore and having spiral guide means formed thereon, cutter means affixed to said sleeve member, operating pin means engaging said spiral guide means and extending through said longitudinal slots, means carrying said pin means and mounted for slidable movement along the housing, inner casing means surrounding said carrying means, bearing means positioned between said inner casing means and said carrying means for permitting free rotation of the latter means within said inner casing means, outer casing means, collar means rotatably positioned thereon, and means for transmitting movement of said collar means to said inner casing means whereby the sleeve member may be rotated relative to said housing to bring the cutter means into engagement with the tube upon longitudinal movement of said inner casing means.

4. A device for cutting a tube comprising an eccentrically bored housing having longitudinal slots formed therein, a sleeve member positioned in the bore and having spiral guide means formed thereon, cutter means affixed to said sleeve member, operating pin means engaging said spiral guide means and extending through said longitudinal slots, means carrying said pin means and mounted for slidable movement along the housing, inner casing means surrounding said carrying means, bearing means positioned between said inner casing means and said carrying means for permitting free rotation of the latter means within said inner casing means, outer casing means surrounding said inner casing means and having parallel spiral slots formed therein, collar means surrounding said outer casing means and adapted for limited rotation and longitudinal movement in relation thereto, openings extending radially through said collar means, bolt means positioned in said openings in said collar means and projecting through said parallel spiral slots in said outer casing means and engaging said inner casing means, and means for rotating said collar means whereby the sleeve member may be rotated relative to said housing to bring the cutter means into engagement with the tube.

5. A device for cutting a tube comprising an eccentrically bored housing having longitudinal slots formed therein, a sleeve member positioned in the bore and having spiral guide means formed thereon, cutter means affixed to said sleeve member, operating pin means engaging said spiral guide means and extending through said longitudinal slots, means carrying said pin means and mounted for slidable movement along the housing, inner casing means surrounding said carrying means, bearing means positioned between said inner casing means and said carrying means for permitting free rotation of the latter means within said inner casing means, outer casing means surrounding said inner casing means and having parallel spiral slots formed therein, collar means surrounding said outer casing means and adapted for limited rotation and longitudinal movement in relation thereto, openings extending radially through said collar means, bolt means positioned in said openings in said collar means and projecting through said parallel spiral slots in said outer casing means and engaging said inner casing means, and means for rotating said collar means whereby the sleeve member may be rotated relative to said housing to bring the cutter means into engagement with the tube, said spiral guide means comprising parallel spiral grooves.

CHARLES H. WOODCOCK.

REFERENCES CITED

The following references are of record in the file of this patent:

UNITED STATES PATENTS

| Number | Name | Date |
| --- | --- | --- |
| 996,310 | Casagrande | June 27, 1911 |
| 1,499,429 | Wiedeke | July 1, 1924 |